United States Patent
Longmore et al.

(10) Patent No.: US 11,947,939 B1
(45) Date of Patent: Apr. 2, 2024

(54) SOFTWARE APPLICATION DEPENDENCY INSIGHTS

(71) Applicant: Amazon Technologies, Inc., Seattle, WA (US)

(72) Inventors: Juan-Pierre Longmore, Seattle, WA (US); Sean Alexander Monroe, Seattle, WA (US); Ajay Narendra Malalikar, Seattle, WA (US); Rajesh Somnath Kamath, Kent, WA (US); Noel O'Flaherty, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 254 days.

(21) Appl. No.: 17/487,364

(22) Filed: Sep. 28, 2021

(51) Int. Cl.
| | |
|---|---|
| *G06F 16/2458* | (2019.01) |
| *G06F 8/41* | (2018.01) |
| *G06F 8/65* | (2018.01) |
| *G06F 9/24* | (2006.01) |
| *H04L 67/025* | (2022.01) |
| *H04L 67/51* | (2022.01) |
| *H04L 67/53* | (2022.01) |
| *H04L 67/75* | (2022.01) |
| *G06F 11/07* | (2006.01) |
| *H04L 9/40* | (2022.01) |

(Continued)

(52) U.S. Cl.
CPC ............ *G06F 8/433* (2013.01); *H04L 67/025* (2013.01); *H04L 67/51* (2022.05); *H04L 67/53* (2022.05); *H04L 67/75* (2022.05); *G06F 11/079* (2013.01); *H04L 43/045* (2013.01); *H04L 43/062* (2013.01); *H04L 63/1425* (2013.01)

(58) Field of Classification Search
CPC ........ G06F 8/433; G06F 11/079; H04L 67/51; H04L 67/53; H04L 67/75; H04L 67/025; H04L 63/1425
See application file for complete search history.

(56) References Cited

U.S. PATENT DOCUMENTS 10,216,608 B1 * 2/2019 Arguelles ............ G06F 11/3612
11,030,068 B1 * 6/2021 Agarwal ............. G06F 11/3006
(Continued)

OTHER PUBLICATIONS

Xiaofeng Guo et al., Graph-Based Trace Analysis for Microservice Architecture Understanding and Problem Diagnosis, Nov. 8-13, 2020, [Retrieved on Nov. 6, 2023]. Retrieved from the internet: <URL: https://dl.acm.org/doi/pdf/10.1145/3368089.3417066> 11 Pages (1387-1397) (Year: 2020).*

(Continued)

*Primary Examiner* — Anibal Rivera
(74) *Attorney, Agent, or Firm* — Thomas Horstemeyer, LLP (57) ABSTRACT

Network services are deployed in a networked environment in association with a user account. Dependencies of a network service, such as other network services, may be identified based on an online analysis and an offline analysis of the network service. Further, anomalies associated with the dependencies may be identified in some situations. A call graph may include nodes corresponding to the network services and its dependencies, and may include an identifier corresponding to a part of the call path that has the anomaly. An inspection of the call graph allows software developers to readily recognize that their service depends on a potentially flawed software that may cause a service failure or outage.

20 Claims, 6 Drawing Sheets

(51) Int. Cl.
    *H04L 43/045*     (2022.01)
    *H04L 43/062*     (2022.01)

(56) References Cited

U.S. PATENT DOCUMENTS

| | | | | |
|---|---|---|---|---|
| 2009/0150472 | A1* | 6/2009 | Devarakonda | G06Q 10/04 |
| | | | | 709/201 |
| 2016/0359695 | A1* | 12/2016 | Yadav | H04L 43/04 |
| 2019/0098106 | A1* | 3/2019 | Mungel | H04L 67/564 |
| 2020/0136891 | A1* | 4/2020 | Mdini | H04L 41/0613 |
| 2020/0366752 | A1* | 11/2020 | White | G06F 11/3409 |
| 2022/0014560 | A1* | 1/2022 | Crabtree | H04L 63/1433 |
| 2022/0043811 | A1* | 2/2022 | Salvat Lozano | H04L 41/5009 |
| 2022/0376970 | A1* | 11/2022 | Chawathe | G06F 11/3452 |

OTHER PUBLICATIONS

Joseph Hejderup et al., Software Ecosystem Call Graph for Dependency Management, May 27-Jun. 3, 2018, [Retrieved on Nov. 6, 2023]. Retrieved from the internet: <URL: https://dl.acm.org/doi/pdf/10.1145/3183399.3183417> 4 Pages (101-104) (Year: 2018).*

"Madge," Github.com, https://github.com/pahen/madge (Last Visited: Aug. 11, 2021).

"Dependency Tree," Github.com, https://github.com/dependents/node-dependency-tree (Last Visited: Aug. 11, 2021).

* cited by examiner

SOFTWARE APPLICATION DEPENDENCY INSIGHTS

BACKGROUND

With the recent advent of network computing services, software development has trended away from building large, inefficient monolithic computing applications towards utilizing network-based services (hereinafter "network services") offered by third-party network service providers. Notably, it is often more efficient to offload intense computing tasks to a network service that, for example, is able to perform parallel computations using a collection of servers and other advanced hardware in a data center, as opposed to performing computations locally on a laptop, mobile device, or other less powerful computing device. However, as modern computing applications now utilize tens, hundreds, or even thousands of services handling an incredible amount of network requests per second, it is difficult to ascertain dependencies of services. Additionally, it is difficult to readily identify resources on which a software application depends. To date, identifying service dependencies is a tedious task, often relying on code reviews performed manually by teams of software engineers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to identifying dependencies of software applications and services, and generating associated insights. Due to increased performance gains and computational efficiencies, software developers today tend to use network services offered by network service providers for handling various tasks. For instance, developers may invoke network services offered by a third-party network service provider to execute computationally intensive machine learning routines, store data in a secure and straightforwardly retrievable manner from any location, virtualize computational resources, execute code "on demand" without requiring a server to be provisioned, and so forth. As such, developers are not required to rewrite existing applications for functions that are readily able to be performed by a network service.

Micro-services are types of network services structured such that they are highly maintainable and testable due to their limited functions and sizes, independently deployable, organized around business capabilities, and/or maintained by a small development team. As software developers continue to utilize services and/or micro-services, "service creep" tends to occur where the use of additional network services increases as features are added, services are broken up into smaller micro-services, or as an application becomes more complex. When adding a network service to a software application, the network service may require various dependencies. Dependencies may include an invocation of another network service, use of a software library, use of a file (e.g., a manifest or configuration file), and so forth.

In some instances, a software development team managing Service A may invoke Service B maintained by a different software development team that relies on other services, such as Service C . . . Service N, overseen by a multitude of software development teams, and so forth. Commonly, circular dependencies are created where services rely on one another. For instance, Service A may invoke Service B, Service B may invoke Service C, and Service C may invoke Service A. If a single service fails or does not operate as intended, all services may be rendered non-functional as well as computing applications that rely on those services. Additionally, there is a high likelihood of users and administrators being locked out of their service, for instance, if an authentication service goes offline or otherwise fails.

As such, it is beneficial to identify dependencies in a quick and reliable manner such that software developers are able to identify and resolve various anomalies and better customize their applications to avoid service failures. Today, many software development teams do not have a detailed understanding of their dependencies, which may be detrimental to service availability and operability.

According to various embodiments, a dependency identification service is provided that performs "online" and/or "offline" analyses of a software application and its associated services to identify service dependencies and anomalies associated therewith based on various policies. Further, the dependency identification service generates a call graph that visualizes the dependencies, the connection therebetween, as well as associated anomalies should they exist.

To perform an online analysis, the dependency identification service may analyze network traffic, such as traffic occurring in a virtual private cloud (VPC), in a service provider network, on hosts (e.g., through intercepted TCP connects and DNS queries). To perform an offline analysis, the dependency identification service accesses and inspects source code, manifest files, configuration files, service logs, system logs, policy documents, and so forth. The dependency identification service may ultimately extract instances in which a service on a host calls or otherwise invokes a resource, which may include a library, a service, and so forth. In this way, the dependency identification service discovers potential dependencies of the caller service on the called service, especially if that interaction is observed multiple times.

Further, in some embodiments, the offline analysis may further include analyzing code to discover use of particular clients both through basic regular expressions as well as static analysis to discover instances in which one particular service creates a client and thus, is expected to call the corresponding service. From this data, a call graph may be generated to permit a service owner to observe a complex structure of dependencies among its services. In some embodiments, anomalies, such as risks, circular dependencies, and the like, may be identified within service call paths. The impact of system maintenance activities and reconfiguration may be further understood. To this end, dependency-related causes of a service outage may be discovered and analyzed in real-time.

Additionally, the dependency identification service may generate one or more graphical user interfaces (GUIs) in which customers can analyze service-based dependencies in a call graph or other visual representation. Further, the dependency identification service may generate one or more data objects containing results of an online and/or offline analysis of a service, which may be sent to a client device. In some embodiments, the discovery service may integrate with software deployment pipelines (e.g., continuous integration (CI) and continuous delivery (CD) software) to analyze and potentially block code changes that show additional unexpected dependencies being taken by newly added code. Thus, a top-down dependency policy may be assisted to avoid a circular dependency and other latent risks.

In the following discussion, a general description of the dependency identification service and its components is provided, followed by a discussion of the operation of the same.

Figure 1:
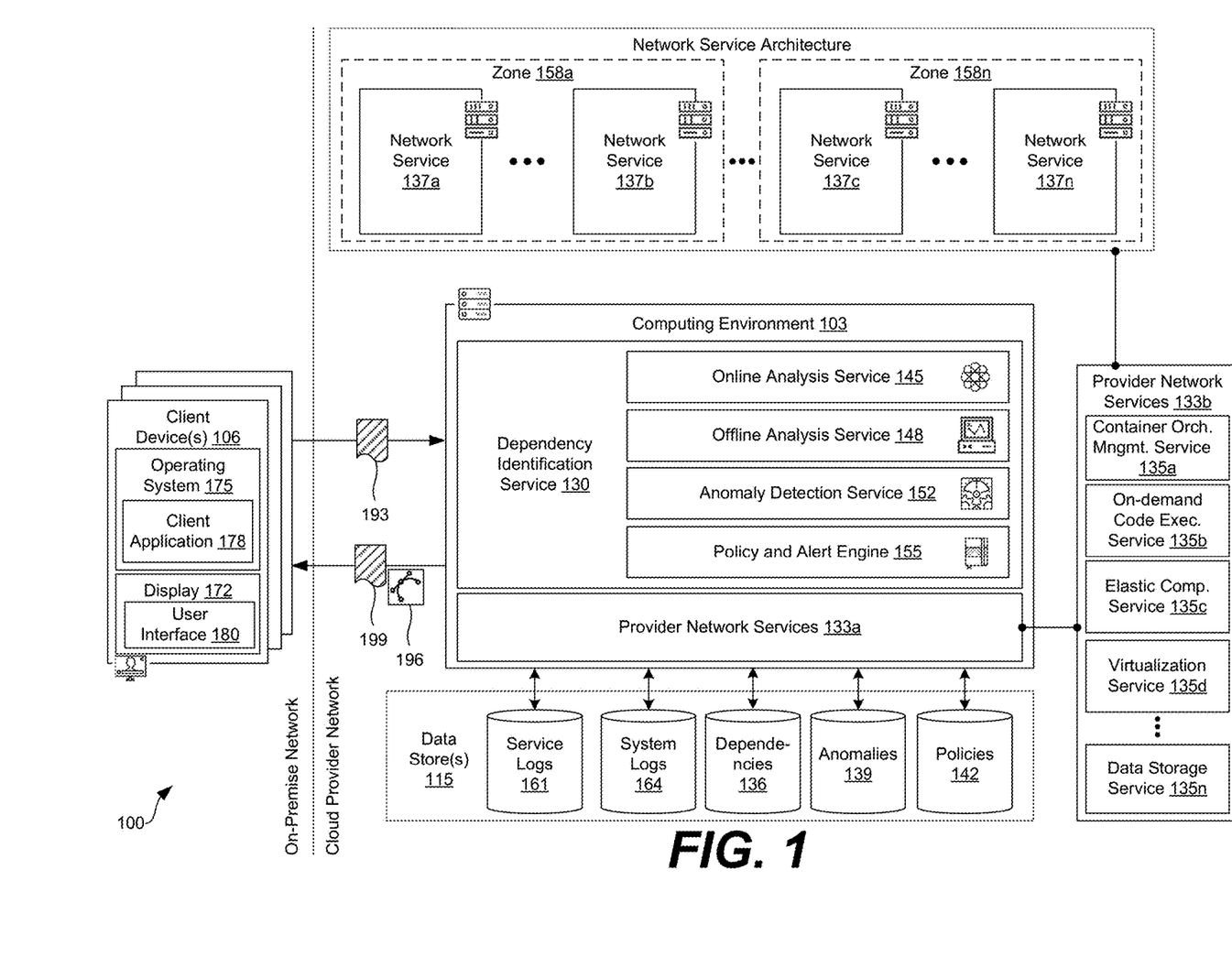
FIG. 1 is a drawing of a networked environment according to various embodiments of the present disclosure.

With reference to FIG. 1, shown is a networked environment 100 according to various embodiments. The networked environment 100 includes a computing environment 103 and a client device 106, which are in data communication with each other via a network. The network includes, for example, the Internet, intranets, extranets, wide area networks (WANs), local area networks (LANs), wired networks, wireless networks, or other suitable networks, etc., or any combination of two or more such networks. For example, such networks may include satellite networks, cable networks, Ethernet networks, and other types of networks.

The computing environment 103 may include, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may include a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

In accordance with various embodiments, the provider network services 133 may include one or more of a container orchestration and management service 135a (referred to in various implementations as a container service, cloud container service, container engine, or container cloud service), an on-demand code execution service 135b (also referred to as a serverless compute service, function compute service, functions service, cloud functions service, or functions-as-a-service, in various implementations), an elastic computing service 135c (referred to in various implementations as an elastic compute service, a virtual machines service, a computing cloud service, a compute engine, or a cloud compute service), a virtualization service 135d, a data storage service 135n, as well as other types of provider network services 133 as can be appreciated.

The container orchestration and management service 135a may enable customers to run containerized workloads, for example, on their own instances or on managed instances through a serverless container service. A container represents a logical packaging of a software application that abstracts the application from the computing environment in which the application is executed. For example, a containerized version of a software application includes the software code and any dependencies used by the code, such that the application can be executed consistently on any infrastructure hosting a suitable container engine (e.g., the Docker® or Kubernetes® container engine).

A container image is a standalone, executable package of software that includes everything needed to run an application process: code, runtime, system tools, system libraries and settings. Container images become containers at runtime. Containers are thus an abstraction of the application layer (meaning that each container simulates a different software application process). Compared to virtual machines (VMs), which emulate an entire computer system, containers virtualize at the level of the operating system 175 and thus typically represent a more lightweight package for running an application on a host computing system. Existing software applications can be "containerized" by packaging the software application in an appropriate manner and generating other artifacts (e.g., a container image, container file, other configurations) used to enable the application to run in a container engine.

The elastic computing service 135c may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units (CPUs) or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics.

Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

It will be appreciated that such virtualized instances may also be able to run in other environments, for example on the premises of customers, where such on-premise instances may be managed by the cloud provider or a third party. In some scenarios the instances may be microVMs. The cloud provider network may offer other compute resources in addition to instances and microVMs, for example containers (which may run in instances or bare metal) and/or bare metal servers that are managed by a portion of a cloud provider service running on an offload card of the bare metal server.

In some embodiments, the execution of compute instances by a compute service is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host.

For example, a microVM can have a stripped-down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core). A microVM can be used in some implementations to run a containerized workload.

The data storage service 135n, for example, may be an elastic block store service (also referred to as a cloud disks service, managed disk service, storage area network service, persistent disk service, or block volumes, in various implementations) that supports customer volumes. In general, a volume can correspond to a logical collection of data, such as a set of data maintained on behalf of a user. The data of the volume may be erasure coded and/or replicated between multiple devices within a distributed computing system, in order to provide multiple replicas of the volume (where such replicas may collectively represent the volume on the computing system).

Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned.

The provider network services 133 may be employed to deploy one or more network service 137 (e.g., a microservice) that perform various functions, such as functionality of a legacy computing application. For instance, an application component, such as a method, a class, a data object, and so forth, may be extracted from a monolithic computing application and its equivalent code or functionality deployed as a microservice offered up by one of the provider network services 133, thereby replacing the application component of the monolithic computing application as part of a software modernization process. An extraction may include the copying and transformation of code from an application component to be executed on a client device 106 to execute in the computing environment 103 and provide similar or identical functionality as a microservice.

In a microservices architecture, an application is arranged as a collection of smaller subunits (e.g., network services 137) that may be deployed and scaled independently from one another, and which can communicate with one another over a network. These microservices are typically fine-grained in that they have specific technical and functional granularity, and often implement lightweight communications protocols. The microservices of an application can perform different functions from one another, may be assigned to different user accounts, may be independently deployable, and may use different programming languages, databases, and hardware/software environments from one another. Decomposing an application into smaller services beneficially improves modularity of the application, enables replacement of individual microservices as needed, and parallelizes development by enabling teams to develop, deploy, and maintain their microservices independently from one another. A microservice may be deployed using a virtual machine, container, or serverless function using the provider network services 133, in some examples. The disclosed techniques may be used to programmatically decompose a monolithic computing application into various microservices or other network services 137.

Various applications and/or other functionality may be executed in the computing environment 103 according to various embodiments. Also, various data is stored in a data store 115 that is accessible to the computing environment 103. The data store 115 may be representative of a plurality of data stores 115 as can be appreciated. The data stored in the data store 115, for example, is associated with the operation of the various applications and/or functional entities described below.

The components executed on the computing environment 103, for example, include a dependency identification service 130, provider network services 133a, 133b (collectively "provider network services 133"), and other applications, services, processes, systems, engines, or functionality not discussed in detail herein. The dependency identification service 130 is executed to identify dependencies 136 of one or more network services 137a . . . 137n (collectively "network services 137"), as well as potential anomalies 139 associated with the dependencies 136 using one or more policies 142. Anomalies 139 may include circular dependencies, self-dependencies, zonal dependencies, regional dependencies, as well as other anomalies as may be appreciated.

To this end, the dependency identification service 130 may include an online analysis service 145, an offline analysis service 148, an anomaly detection service 152, a policy and alert engine 155, as well as other applications, services, processes, systems, engines, or functionality not discussed in detail herein. The online analysis service 145 analyzes traffic occurring over the network to or from a network service 137 to identify a potential dependency 136. For instance, requests and responses sent and received among two or more network services 137 may be identified as a potential dependency 136 for a network service 137 sending the requests.

In some embodiments, the online analysis service 145 identifies live traffic while the network service 137 is in a live stage or is otherwise invoking or being invoked by other live network services 137. In some embodiments, however, the dependency identification service 130 may provide "test traffic" to the network service 137 to identify potential dependencies 136, for instance, while the network service 137 is in a testing or deployment stage of a network service lifecycle.

In some situations, network services 137 are deployed in zones 158a . . . 158n (collectively "zones 158") which may be data centers deployed in different geographic locations. Traffic from a presumably zonally-isolated one of the network services 137 going out of zone 158 may suggest a cross-zone type of dependency 136. In that case, impact to a network service 137 in one zone 158 may knock out other zones 158, causing a correlated failure in one or more of the network services 137. Similarly, a regional independence type of policy 142, an ideal scenario for various types of network services 137, requires no cross-region traffic. A typical example of a failure may include a service team that, during a region build, uses an out-of-region network service 137 for their network service 137 under development. However, the service team does not remember to migrate to a region-local network service 137 before launch. As such, the dependency identification service 130 may recognize these as regional dependencies, which may include a type of anomaly 139 that is identified to give service teams runway to fix anomalies 139 and resolve dependencies 136.

The offline analysis service 148 is executed to access source code, service logs 161, system logs 164, policy documents, flow logs (e.g., virtual private cloud flow logs, cloud trail logs, manifest files, configuration files, policy documents, and other offline information to identify potential dependencies 136. For instance, a manifest file or a configuration file may identify packages, libraries, and or network endpoints required for a network service 137 to execute or communicate.

For instance, a policy document may include a data object (e.g., a JavaScript object notation (JSON) data object, an extensible markup language (XML) data object, etc.) having one or more predefined policies to be implemented during execution of code of a network service 137. In some examples, a policy document may be used for an authorization or authentication. For example, a policy document may indicate that a remote network service having a predefined identifier is permitted to call or invoke a network service 137 managed by an administrator, and perform a list of predefine operations on the network service 137. The offline analysis service 148 may identify potential dependencies 136 from the policy document.

Once a dependency 136 has been identified, the anomaly detection service 152 is executed to determine if an anomaly 139 associated with the dependency 136 exists. Anomalies 139 may include, for example, circular dependencies, self-dependencies, out-of-zone dependencies, dependencies 136 on known non-reliable services, libraries, other resources, and so forth.

The policy and alert engine 155 is executed to assist the anomaly detection service 152 in determining whether a potential anomaly 139 is, in fact, an anomaly 139 based on predetermined policies 142 stored in the data store 115. Additionally, the policy and alert engine 155 may surface anomalies 139 to an administrator of a network service 137 or other specified user.

In some embodiments, an owner of a network service 137 or an administrator of a network service provider may manually create a policy 142 specifying a preexisting known type of dependency 136. However, in some embodiments, the dependency identification service 130 may degrade belief in the dependency 136 being, in fact, a dependency 136 over time if the dependency identification service 130 does not collect sufficient data to verify it being an actual dependency 136.

To this end, the policy and alert engine 155 may generate a score for each potential dependency 136 and, if the score exceeds a threshold score, the potential dependency 136 may be recognized as an actual dependency 136. In some embodiments, the score for a potential dependency 136 is generated as a weighted summation of various factors determined via:

$$\omega_1 F_1 + \omega_2 F_2 + \ldots + \omega_n F_n = \text{DependencyScore} \qquad (\text{eq. 1}),$$

where $\omega$ are weights assigned to each factor F. In some embodiments, the weights may be degraded over time. The factors F may include whether a developer has indicated that a potential dependency 136 is, in fact, a dependency 136, whether an online analysis of the potential dependency 136 indicates whether it is a dependency 136, whether an offline analysis of the potential dependency 136 indicates whether it is a dependency 136, and so forth. In some embodiments, the weights $\omega$ may be determined and/or optimized using one or more machine learning routines. If a score drops below a certain threshold, violations of a policy 142 may be used to notify service owners to reassess the belief that a potential dependency 136 is, in fact, a dependency 136.

The data stored in the data store 115 includes, for example, service logs 161, system logs 164, dependencies 136, anomalies 139, policies 142, and potentially other data. Service logs 161 and system logs 164 may include logs recording events associated with a network service 137. For instance, some network services 137 may be configured to store events in the service log 161 when it receives or transmits data from or to another network service 137. Similarly, system logs 164 may include evidence of interaction with other services. Dependencies 136 may include both potential dependencies 136 as well as verified dependencies 136 (e.g., dependencies 136 having a score exceeding a threshold). Similarly, anomalies 139 may include both potential anomalies 139 as well as verified anomalies 139 (e.g., anomalies 139 having a score exceeding a threshold). Policies 142 may include criteria predefined by an administrator of a network service 137 or a network service provider that indicates that a dependency 136 or information associated therewith is indicative of an anomaly 139.

The client device 106 is representative of a plurality of client devices that may be coupled to the network. The client device 106 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 106 may include a display 172. The display 172 may include, for example, one or more devices such as liquid crystal display (LCD) displays, gas plasma-based flat panel displays, organic light emitting diode (OLED) displays, electrophoretic ink (E-ink) displays, LCD projectors, other types of display devices, etc.

The client device 106 may be configured to execute an operating system 175 and/or various applications, such as a client application 178 and other applications. The client application 178 may be executed in a client device 106, for example, to access network content served up by the computing environment 103 and/or other servers, thereby rendering a user interface 180 on the display 172. To this end, the client application 178 may include, for example, a browser, a dedicated application, etc., and the user interface 180 may include a network page, an application screen, etc. The client device 106 may be configured to execute applications beyond the client application 178 such as, for example, email applications, social networking applications, word processors, spreadsheets, and/or other applications.

Next, a general description of the operation of the various components of the networked environment 100 is provided. To begin, it is understood that software developers or other administrators of a network service 137 may desire to optimize its network service 137 so that it would continue to operate in certain scenarios, such as a power outage causing dependencies 136 to fail. Additionally, it is understood that software developers or other administrators of a network service 137 may desire to fix a network service 137 that is down or otherwise failing.

To this end, the dependency identification service 130 may expose how network services 137 depend on one another. For example, in a service outage, knowing that many network services 137 depend on domain name system (DNS) redirects operational effort to restoring DNS first, for example. Under less time critical conditions, deploying a potentially impactful software update may require first identifying and engaging a list of customers and services that are dependent on a network service 137. Reducing risk in these scenarios includes a developer having an understanding of dependencies 136 of a network service 137.

According to various embodiments, a dependency identification service is provided that performs "online" and/or "offline" analyses of a software application and its associated services to identify service dependencies and anomalies associated therewith based on various policies. Further, the dependency identification service generates a call graph that visualizes the dependencies, the connection therebetween, as well as associated anomalies should they exist.

As such, a client device 106 may be accessed by an administrator (e.g., via an administrator client device 106) to submit a request 193 to identify dependencies 136 of a network service 137 (or of a software application or collection of software applications, for example). The network service 137 may include, for example, one of the provider network services 133, or an application executing in one of the provider network services 133 (e.g., in a container, in an instance, etc.). Upon receipt of the request 193, the dependency identification service 130 may perform an online analysis of the network service 137 using the online analysis service 145 and/or an offline analysis of the network service 137 using the offline analysis service 148.

To perform an online analysis, the dependency identification service 130 may analyze network traffic, such as traffic occurring in a VPC, in a service provider network, on hosts, and so forth. For instance, in some embodiments, a network event listener may be spawned in a host, in a VPC, etc., sometimes via a network service 137, that is capable of monitoring network traffic to and from the network service 137, for example, through intercepted TCP connects, DNS queries, user datagram protocol (UDP) queries, and the like. For instance, if a first network service 137 submits a hypertext transfer protocol (HTTP) query to a second network service 137, the first network service 137 may potentially depend on the second network service 137. Any potential dependencies 136 may be identified and saved in the data store 115 in association with the network service 137.

To perform an offline analysis, the offline analysis service 148 accesses and inspects source code of the network service 137, manifest files, configuration files, service logs 161, system logs 164, and the like. The dependency identification service 130 may ultimately extract instances in which a service on a host calls or otherwise invokes a resource as a potential dependency 136, which may include a library, a service, and so forth. In this regard, the dependency identification service 130 discovers potential dependencies 136 of a caller network service 137 on the called network service 137, especially if the interaction is observed multiple times by the offline analysis service 148.

Further, in some embodiments, the offline analysis may further include analyzing code to discover use of particular clients both through basic regular expressions as well as static analysis to discover instances in which one particular network service 137 creates a client and thus, is expected to call a corresponding network service 137.

Once potential dependencies 136 are identified, the policy and alert engine 155 may determine which of the dependencies 136 are to be treated as actual dependencies 136. In various embodiments, the policy and alert engine 155 may generate a score for each potential dependency 136 and, if the score exceeds a threshold score, the potential dependency 136 may be recognized as an actual dependency 136. In some embodiments, the score for a potential dependency 136 is a generated as a weighted summation of various factors determined via eq. 1 above.

In some embodiments, the weights for various factors may be degraded over time; however, new detections of the potential dependency 136 may increase the weights and/or remove the degradation of the weights over time. The factors F may include whether a developer has indicated that a potential dependency 136 is, in fact, a dependency 136, whether an online analysis of the potential dependency 136 indicates whether it is a dependency 136, whether an offline analysis of the potential dependency 136 indicates whether it is a dependency 136, and so forth. In some embodiments, the weights w may be determined and/or optimized using one or more machine learning routines. If a score for a potential dependency 136 exceeds a threshold score, the potential dependency 136 may be treated as an actual dependency 136.

When actual dependencies 136 are identified or determined, the anomaly detection service 152 may identify whether any anomalies 139 exist in association with the dependencies 136. Anomalies 139 may include, for example, circular dependencies, self-dependencies, out-of-zone dependencies, dependencies 136 on known non-reliable services, libraries, and other resources, and so forth. As such, the dependencies 136 may be analyzed to identify whether the dependencies 136 breach various policies 142, such as a policy 142 indicating that circular dependencies, self-dependencies, and out-of-zone dependencies are not best practices, and so on. In some embodiments, service call paths may be analyzed to identify anomalies 139.

The dependency identification service 130 may generate a call graph 196 that permits a service owner or other end user to observe a complex structure of dependencies 136 among its network services 137. The call graph 196 may include visual representations of a network service 137 and its dependencies 136, as well as any anomalies 139 identified. The call graph 196 may be sent to the client device 106 in a response 199, for example. In some embodiments, the call graph 196 is a generated image, network page, or user interface data to be shown on the client device 106. The impact of system maintenance activities and reconfiguration may be further understood. To this end, dependency-related causes of a service outage may be discovered and analyzed in real-time.

Accordingly, the dependency identification service 130 may identify, expose, and alarm on risky dependencies 136 among network services 137. Some organizations may run resiliency testing, such as game day testing. Game day testing includes simulations regarding a failure or event to test systems, processes, and team responses, where personnel must make careful use of limited time to identify exactly which network services 137 are at risk for circular dependencies and other anomalies 139 that are worth testing. As such, the dependency identification service 130 may notify administrators of systems and services with hidden circular dependencies and other anomalies 139 which may be included in game day testing or other simulations. For instance, if a development team were to discover that a network service 137 was unrecoverable, code changes may be implemented and the network service 137 may be re-deployed with a higher confidence.

Further, in some embodiments, the dependency identification service 130 may track dependencies 136 over time or, in other words, monitor a history of a network service 137 and its dependencies 136. As such, when a potential dependency 136 is identified, the dependency identification service 130 may use a past dependency 136 as an indication whether the potential dependency 136 is an actual dependency 136 or is not a dependency 136.

Figure 2:
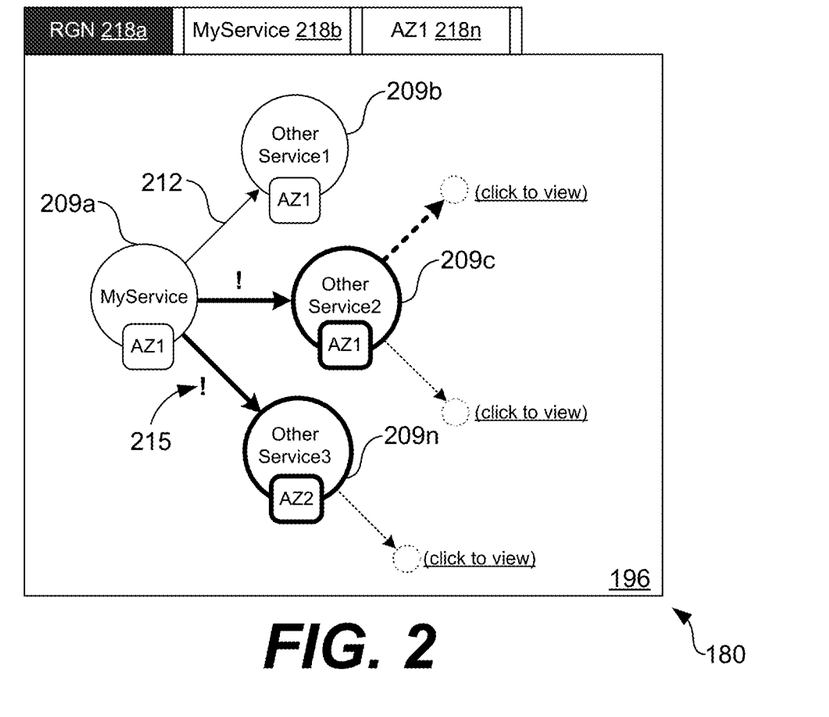
FIGS. 2-4 are pictorial diagrams of example user interfaces rendered by a client device in the networked environment of FIG. 1 according to various embodiments of the present disclosure.
Figure 3:
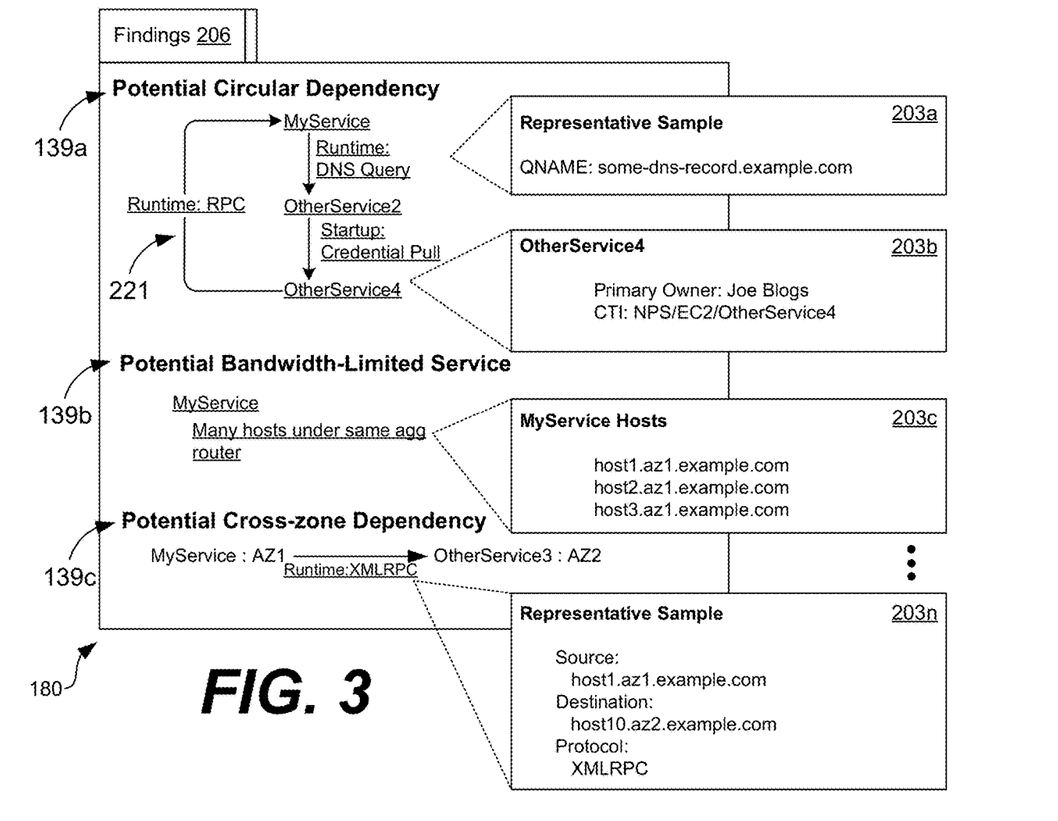
Figure 4:
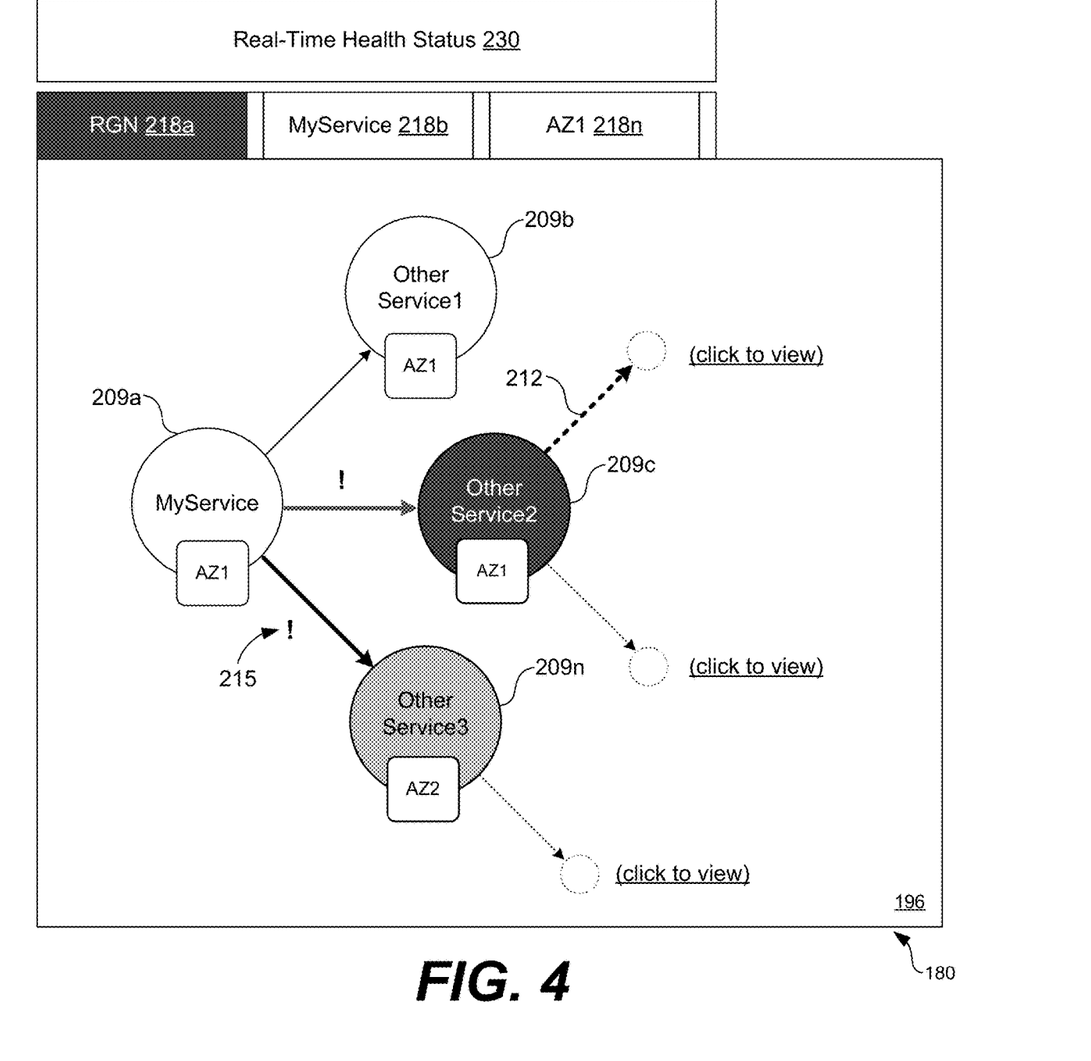

Referring next to FIGS. 2-4, examples of one or more user interfaces 180 generated by the dependency identification service 130 are shown according to various embodiments. An administrator client device 106 may access a console, such as a network service provider customer-facing console, that displays the user interfaces 180 such that an administrator or team of developers of a network service 137 or other application may view and understand the dependencies 136 of the network service 137 or other application.

As such, various dependency insights 203a . . . 203n (collectively "dependency insights 203") may be generated that provide a service owner with a call graph 196, or other suitable graphical representation, of a network service 137 and its dependencies 136. Notably, the user interface 180 of FIG. 2 highlights initial connections that begin a chain of dependencies 136 that potentially lead to an anomaly 139, such as a self-dependency, a result from bad placement choices, or cross-zone dependencies 136. The dependency insights 203 may provide key realizations regarding availability and performance of a network service 137, such as "MyService."

If anomalies 139 are identified, a list of troubling chains may be shown graphically, for instance, in the user interface 180 of FIG. 2 and in textual form in a findings region 206 of the user interface 180 of FIG. 3. In some embodiments, alerts may be generated through integration with the policy and alert engine 155 and by emitting service specific metrics. In some embodiments, any initial dependency 136, such as those shown in FIGS. 2 and 4, can be selected or otherwise manipulated to discover additional underlying dependencies 136.

Referring to the user interfaces 180 of FIGS. 2 and 4, the user interfaces 180 may include nodes 209a . . . 209n (collectively "nodes 209") that correspond to network services 137 and dependencies 136. The nodes 209 are shown in a tiered or hierarchical relationship in which nodes 209 are represented as being invoked by other nodes 209. For instance, in some embodiments, a first subset of the nodes 209 (e.g., node 209a) may correspond to a network service 137 of the service owner, a second subset of the nodes 209 (e.g., nodes 209b . . . 209n) may correspond to dependencies 136 identified by the dependency identification service 130, and so forth. The nodes 209 may be connected by links 212, shown in FIGS. 2 and 4 as directional arrows that illustrate a direction of a dependency 136. For instance, MyService invokes and is dependent on OtherService1, OtherService2, OtherService3, and so forth. The nodes 209 may be selected or otherwise manipulated to view additional information associated with each of the nodes 209.

When an anomaly 139 associated with a node 209 (or, rather, a corresponding network service 137) is identified, the user interface 180 may emphasize impacted nodes 209. For instance, the user interface 180 of FIG. 2 shows the nodes 209 corresponding to OtherService2 and OtherService3 as being emphasized relative to other nodes 209. Additionally, an identifier 215 (e.g., an icon) is shown near or otherwise relative to a problematic one of the links 212 that indicates a presence of an anomaly 139. An end user may select the identifier 215 (e.g., a "!" icon), or may select "(click to view)" or other suitable component, to access the user interface 180 of FIG. 3 to view additional information related to the anomaly 139. A selection or manipulation of each node 209 corresponding to a network service 137 or dependency 136 may provide information, such as a service owner; whether any anomalies 139 were identified for the dependency 136 and, if so, information associated therewith; cloud-threat-intelligence (CTI); and other metadata.

Tabs 218a . . . 218n (collectively "tabs 218") may filter the display of the nodes 209. For instance, a first tab 218a ("RGN") may be selected to view nodes 209 for a particular region, a second tab 218b ("MyService") may be selected to view nodes 209 associated with MyService (e.g., a network service 137), and a third tab 218n ("AZ1") may be selected to view nodes 209 associated with a particular zone 158 or region.

As shown in the user interface 180 of FIG. 3, dependency edges 221 show a protocol or a call type as well as a time of occurrence (e.g., "Runtime: DNS Query"). "Startup" refers to a host boot time or a service start time. Other times may include "Runtime." Further, the user interface 180 of FIG. 3 provides additional information associated with identified anomalies, such as an anomaly 139a of a potential circuit dependency, an anomaly 139b of a cross-zone dependency, and an anomaly 139c of a potential bandwidth-limited service.

Referring again to FIG. 4, in some embodiments, service teams may programmatically provide a network service provider with a real-time health status 230 using, for example, service health monitors executable in a network service 137 (e.g., as a routine or a plug-in) or in a same environment as a network service 137. As such, the network service provider may establish whether a network service 137 is healthy or not without specific knowledge of the network service 137. Thus, service health monitors may provide the dependency identification service 130 with a source of dependency data and service health input. In some embodiments, a status of high-level service health monitors may be overlaid on top of the call graph 196 allowing inferring dependencies not codified in the health status monitor itself (where one network service 137 depends on metrics of another network service 137). Based on the foregoing, it may be quickly established whether a failure originates from during a severe event, such as an outage.

It is understood that the user interfaces 180 of FIGS. 2-4 may include dependencies 136 identified when a network service 137 is deployed in a production environment or a deployment (e.g., a live) environment. For instance, a production environment may include an environment in which a network service 137 is actively being coded, debugged, tested, or other analyzed before deployment as a live service. A deployment environment, on the other hand, indicates that the service is live and an endpoint of the network service 137 is being accessed by other services in production.

In some embodiments, the user interface 180 shown for a network service 137 may vary based on a stage of a lifecycle of a network service 137, as may be appreciated. For instance, a network service 137 may be in a building stage (e.g., coding and testing), a running stage (e.g., production or live), a redundancy testing stage, and so forth. In some embodiments, the dependency identification service 130 may identify the stage of lifecycle of the network service 137. For instance, if the dependency identification service 130 detects that the network service 137 is calling test endpoints or a number of queries to the network service 137 is below a threshold number, it may be inferred that the network service 137 is in a building stage. Conversely, if the dependency identification service 130 detects that the network service 137 is calling live endpoints or a number of queries to the network service 137 is below a threshold number, it may be inferred that the network service 137 is in a running or production stage.

Figure 5:
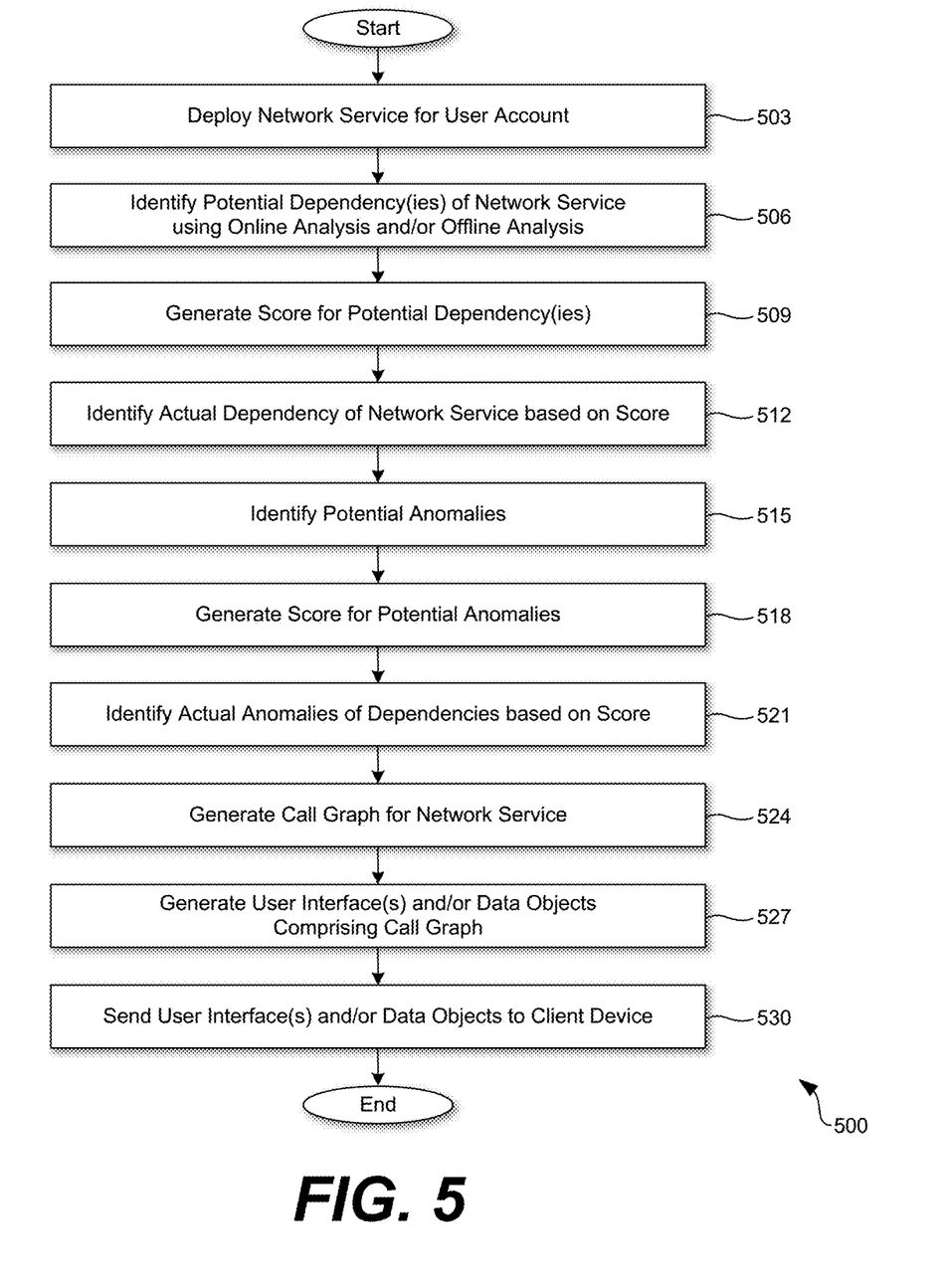
FIG. 5 is a flowchart illustrating one example of functionality implemented as portions of a dependency identification service executed in a computing environment in the networked environment of FIG. 1 according to various embodiments of the present disclosure.

Referring next to FIG. 5, a flowchart 500 is shown that provides one example of the operation of a portion of the dependency identification service 130 according to various embodiments. It is understood that the flowchart of FIG. 5 provides merely an example of the many different types of functional arrangements that may be employed to implement the operation of the portion of the dependency identification service 130 as described herein. As an alternative, the flowchart of FIG. 5 may be viewed as depicting an example of elements of a method implemented in the computing environment 103 according to one or more embodiments.

Beginning with box 503, a computing environment 103 may deploy a network service 137 for a user account, for instance, in a production environment (e.g., a testing and coding environment) or a deployment environment (e.g., a live environment). A network service 137 may include, for instance, one of the provider network services 133. In some examples, the network service 137 includes a container or an instance hosted in a virtual computing environment that performs a function according to a configuration of the network service 137 performed by a developer or development team. While network services 137 are described herein, it is understood that the embodiments described herein encompass applications and services that may not be regarded as network services 137, but are those that utilize network endpoints.

To test a network service 137 against various types of failure, or in an attempt to restore a network service 137 during an outage, a client device 106 may be accessed by an administrator client device 106 to submit a request 193 to the dependency identification service 130 to identify dependencies 136 of the network service 137.

As such, in box 506, the dependency identification service 130 may perform an online analysis and/or an offline analyses of the network service 137 and dependencies 136 to identify a list of potential dependencies 136 based on various preconfigured policies 142. The online analysis of the network service 137 may include, for example, the online analysis service 145 analyzing network traffic to identify potential dependencies 136, such as traffic occurring in a VPC, in a service provider network, on hosts, etc. Monitoring network traffic may include intercepting TCP connections, DNS queries, UDP queries, and the like. Potential dependencies 136 identified during the online analysis may be saved in the data store 115 in association with the network service 137, and may be later correlated with potential anomalies 139 identified in the offline analysis.

The offline analysis may include the offline analysis service 148 accessing and inspecting source code of the network service 137, manifest files, configuration files, service logs 161, system logs 164, policy documents, and the like. The dependency identification service 130 may ultimately extract instances in which a service on a host calls or otherwise invokes a resource as a potential dependency 136, which may include a library, a service, and so forth. With this respect, the dependency identification service 130 may discover potential dependencies 136 of a caller network service 137 on the called network service 137, especially if an interaction between network services 137 is observed multiple times by the offline analysis service 148.

Further, in some embodiments, the offline analysis may further include analyzing code to discover use of particular clients both through basic regular expressions as well as static analysis to discover instances in which one particular network service 137 creates a client and thus, is expected to call a corresponding network service 137.

Once potential dependencies 136 are identified, the dependency identification service 130 may determine which of the dependencies 136 identified in box 506 are to be treated as actual dependencies 136. As such, in box 509, the dependency identification service 130 may generate a score for each potential dependency 136.

In box 512, if the score generated in box 509 exceeds a threshold score, the dependency identification service 130 may recognize a potential dependency 136 as an actual dependency 136. In some embodiments, the score for a potential dependency 136 is a generated as a weighted summation of various factors determined via eq. 1 above. The factors may include whether a developer or an administrator has indicated that a potential dependency 136 is, in fact, a dependency 136 (e.g., a manual verification), whether an online analysis of the potential dependency 136 indicates whether it is a dependency 136, whether an offline analysis of the potential dependency 136 indicates whether it is a dependency 136, and/or whether a potential dependency 136 was identified both in the online and the offline analysis, among other factors.

According to various embodiments, the weights for some or all of the factors may be degraded over time. New detections of the potential dependency 136, however, may increase the weights and/or remove the degradation of the weights over time. The factors F may include whether a developer has indicated that a potential dependency 136 is, in fact, a dependency 136, whether an online analysis of the potential dependency 136 indicates whether it is a dependency 136, whether an offline analysis of the potential dependency 136 indicates whether it is a dependency 136, and so forth. In some embodiments, the weights w may be determined and/or optimized using one or more machine learning routines. If a score for a potential dependency 136 exceeds a threshold score, the potential dependency 136 may be treated as an actual dependency 136.

When actual dependencies 136 are identified or determined, in box 515, the anomaly detection service 152 may identify whether any anomalies 139 exist in association with the dependencies 136. Anomalies 139 may include, for example, circular dependencies, self-dependencies, out-of-zone dependencies, dependencies 136 on known non-reliable services, libraries, and other resources, and so forth. As such, the dependencies 136 may be analyzed to identify whether the dependencies 136 breach various preconfigured policies 142, such as a policy 142 indicating that circular dependencies, self-dependencies, and out-of-zone dependencies are not permitted, best practice, and so forth. As may be appreciated, service call paths may be analyzed to identify the anomalies 139.

Similarly to box 509, in box 518, the dependency identification service 130 may generate a score for each potential anomaly 139 identified in box 515. Like the score generated for a potential dependency 136, the score generated for the potential anomaly 139 may be determined as a function of a summation of weighted factors or other adequate function. The factors may include, whether the anomaly 139 was identified from multiple sources (e.g., identified in both a manifest file and a static code analysis), whether the anomaly 139 is indicative of a potential failure point, and so forth. In box 521, if the score generated in box 518 exceeds a threshold score, the dependency identification service 130 may recognize a potential anomaly 139 as an actual anomaly 139, which may be shown in a user interface 180 for example.

In box 524, the dependency identification service 136 may generate a call graph 196 for the network service 137. The call graph 196 may include a visualization that permits a service owner or other end user to observe and interact with a complex structure of dependencies 136 among its network services 137. For instance, the call graph 196 may include visual representations of a network service 137 and its dependencies, as well as any anomalies 139 identified, as shown in the call graph 196 of FIGS. 2 and 4.

Once generated, in box 527, a user interface 180 may be generated comprising the call graph 196 and, in box 530, the call graph 196 may be sent to the client device 106. In some embodiments, the call graph 196 is a generated image, network page, or user interface data to be shown on the client device 106.

Accordingly, the dependency identification service 130 may identify, expose, and generate notifications and/or alarms regarding potentially risky dependencies 136 among network services 137. Some organizations may run resiliency testing, such as game day testing. Game day testing includes simulations regarding a failure or event to test systems, processes, and team responses, where personnel must make careful use of limited time to identify exactly which network services 137 are at risk for circular dependencies and other anomalies 139 that are worth testing. As such, the dependency identification service 130 may notify administrators of systems and services with hidden circular dependencies and other anomalies 139 which may be included in game day testing or other simulations. For instance, if a development team were to discover that a network service 137 was unrecoverable, code changes may be implemented and the network service 137 may be redeployed with a higher confidence.

Figure 6:
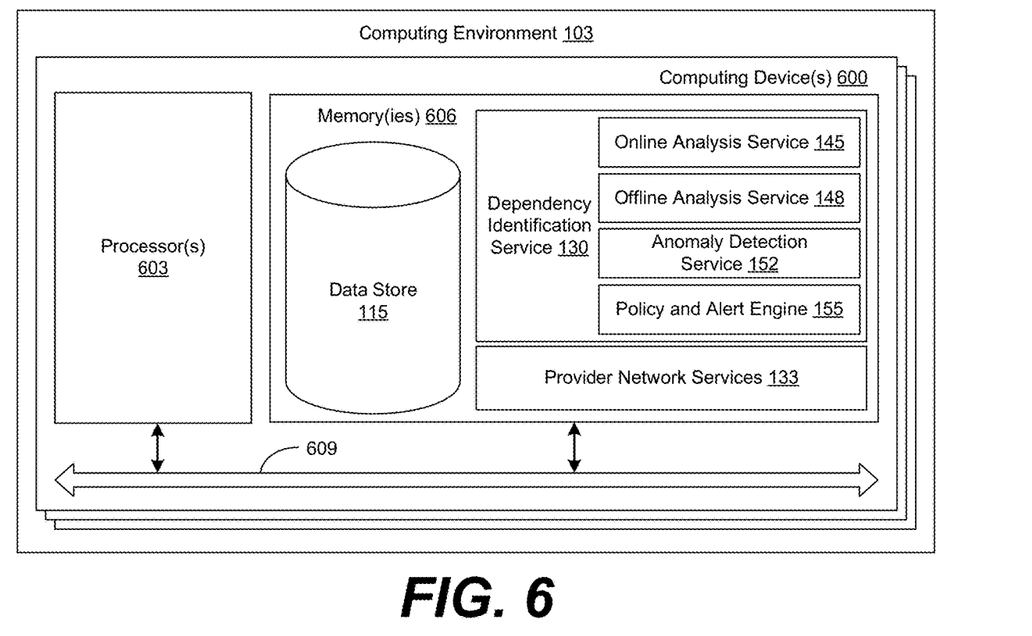
FIG. 6 is a schematic block diagram that provides one example illustration of a computing environment employed in the networked environment of FIG. 1 according to various embodiments of the present disclosure.

With reference to FIG. 6, a schematic block diagram of the computing environment 103 is shown according to an embodiment of the present disclosure. The computing environment 103 includes one or more computing devices 600. Each computing device 600 includes at least one processor circuit, for example, having a processor 603 (i.e., a hardware processor) and a memory 606, both of which are coupled to a local interface 609. To this end, each computing device 600 may include, for example, at least one server computer or like device. The local interface 609 may include, for example, a data bus with an accompanying address/control bus or other bus structure as can be appreciated.

Stored in the memory 606 are both data and several components that are executable by the processor 603. In particular, stored in the memory 606 and executable by the processor 603 are the dependency identification service 130, the online analysis service 145, the offline analysis service 148, the anomaly detection service 152, the policy and alert engine 155, and potentially other applications and services. Also stored in the memory 606 may be a data store 115 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may include additional systems designed to coordinate this communication, including, for example, performing load balancing. The processor 603 may be of electrical or of some other available construction.

Although the dependency identification service 130, the online analysis service 145, the offline analysis service 148, the anomaly detection service 152, the policy and alert engine 155, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIG. 5 shows the functionality and operation of an implementation of portions of the dependency identification service 130, the online analysis service 145, the offline analysis service 148, the anomaly detection service 152, and the policy and alert engine 155. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the dependency identification service 130, the online analysis service 145, the offline analysis service 148, the anomaly detection service 152, and the policy and alert engine 155, that includes software or code can be embodied in any non-transitory computer-readable medium for use by or in connection with an instruction execution system such as, for example, a processor 603 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium may include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the dependency identification service 130, the online analysis service 145, the offline analysis service 148, the anomaly detection service 152, and the policy and alert engine 155, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:

at least one computing device; and memory having a dependency identify service stored thereon comprising program instructions executable in the at least one computing device that, when executed, direct the at least one computing device to:

analyze source code of a network service;

analyze network traffic between the network service and another network endpoint;

analyze at least one of a service log of the network service and a system log associated with execution of the network service;

identify a plurality of dependencies of the network service based at least in part on an analysis of the source code of the network service, the network traffic, and the at least one of the service log and the system log;

identify an anomaly associated with a chain of at least two dependencies of the plurality of dependencies of the network service;

generate a call graph comprising a plurality of nodes in a hierarchical relationship, a first subset of the nodes in the call graph corresponding to the network service and a second subset of the nodes corresponding to the dependencies of the network service, the call graph comprising an icon identifying the anomaly;

generate at least one user interface comprising the call graph, and send the at least one user interface to an administrator client device associated with the network service; and in response to a manipulation of the icon in the at least one user interface when shown in a display, display information in an anomaly findings user interface separate from the call graph, wherein the anomaly findings user interface includes: a textual indication of a type of the anomaly, the chain of at least two dependencies that cause the anomaly, and at least one interaction in the chain of at least two dependencies, wherein the at least one interaction indicates a protocol or a call type used for the at least one interaction.

2. The system of claim 1, wherein the network traffic is identified through intercepting one of a transmission control protocol (TCP) connection, a domain name system (DNS) query, and a user datagram protocol (UDP) query.

3. The system of claim 1, wherein:

the plurality of dependencies of the network service are identified from a plurality of potential dependencies identified from the analysis of the source code of the network service, the network traffic, and the at least one of the service log and the system log, based at least in part on a score generated for individual ones of the potential dependencies; and the anomaly associated with the at least one of the dependencies is identified from a plurality of potential anomalies based at least in part on a score generated for individual ones of the potential anomalies.

4. A system, comprising:

at least one computing device; and memory comprising program instructions stored thereon executable by the at least one computing device that, when executed, direct the at least one computing device to:

deploy a network service in a networked environment in association with a user account in one of a testing environment or a production environment;

identify a dependency of the network service based at least in part on an analysis of network traffic between the network service and another network service;

generate a call graph comprising a plurality of nodes, wherein a first one of the nodes corresponds to the network service and a second one of the nodes corresponds to the dependency;

identify an anomaly associated with a chain of at least two dependencies of a plurality of dependencies of the network service; and generate at least one user interface comprising the call graph, and send the at least one user interface to a client device associated with the user account, wherein a manipulation of an anomaly user interface component in the call graph updates the at least one user interface to show an anomaly findings user interface that includes: a textual indication of a type of the anomaly, the chain of at least two dependencies that cause the anomaly, and at least one interaction in the chain of at least two dependencies.

5. The system of claim 4, wherein the at least one computing device is further directed to identify the anomaly associated with the dependency between the network service and the other network service.

6. The system of claim 5, wherein the anomaly associated with the dependency is identified from a plurality of potential anomalies based at least in part on a score generated for individual ones of the potential anomalies.

7. The system of claim 5, wherein the type of the anomaly is one of a circular dependency, a zonal dependency, and a regional dependency.

8. The system of claim 5, wherein:

the call graph further comprises an identifier associated with the anomaly; and the at least one computing device is further directed to, in response to a manipulation of the identifier in the at least one user interface when shown in a display, display information associated with the anomaly in the at least one user interface.

9. The system of claim 4, wherein the at least one computing device is further directed to:

deploy a traffic listening service in a virtual private cloud (VPC) of a user account configured to identify service calls from the network service to another network service, wherein the dependency of the network service is identified based on an analysis of the network traffic of the virtual private cloud.

10. The system of claim 4, wherein:

the dependency is one of a plurality of dependencies identified;

a first subset of the nodes in the call graph correspond to the network service; and a second subset of the nodes in the call graph correspond to individual ones of the dependencies.

11. The system of claim 10, wherein:

the dependency is a first one of the dependencies identified; and a second one of the dependencies is identified based at least in part on an analysis of at least one of a service log, a system log, and a virtual private cloud (VPC) flow log.

12. The system of claim 11, wherein a third one of the dependencies is identified based at least in part on a static code analysis of source code of the network service.

13. The system of claim 4, wherein the network traffic is analyzed by intercepting one of a transmission control protocol (TCP) connection, a domain name system (DNS) query, and a user datagram protocol (UDP) query.

14. The system of claim 4, wherein:
the dependency is one of a plurality of dependencies; and
the plurality of dependencies of the network service are identified from a plurality of potential dependencies identified from an analysis of at least one of the network traffic and an offline analysis of the network service.

15. The system of claim 14, wherein the offline analysis comprises an analysis of at least one of: source code of the network service, a configuration file associated with the network service, a manifest file associated with the network service, a service log, a system log, a policy document, and a virtual private cloud (VPC) flow log.

16. A method, comprising:
deploying, by at least one computing device comprising at least one hardware processor, a network service in a networked environment in association with a user account;
identifying, by the at least one computing device, a dependency of the network service based at least in part on an online analysis of the network service and an offline analysis of the network service;
identifying, by the at least one computing device, an anomaly associated with the dependency;
generating, by the at least one computing device, a call graph comprising an identifier corresponding to the anomaly and a plurality of nodes, wherein a first one of the nodes corresponds to the network service, a second one of the nodes corresponds to the dependency, and the first one and the second one of the nodes are connected by a directional link;
generating, by the at least one computing device, at least one user interface comprising the call graph;
sending, by the at least one computing device, the at least one user interface to a client device associated with the user account;
identifying a manipulation of the identifier, wherein the identifier is associated with the anomaly; and
generating an anomaly findings user interface that is separate from the call graph, the anomaly findings user interface comprising: a textual indication of a type of the anomaly, a chain of at least two dependencies that cause the anomaly, and at least one interaction in the chain of at least two dependencies.

17. The method of claim 16, wherein the online analysis comprises an analysis of, by the at least one computing device, network traffic between the network service and a network endpoint corresponding to the dependency.

18. The method of claim 17, wherein the network traffic is analyzed by intercepting, by the at least one computing device, one of a transmission control protocol (TCP) connection, a domain name system (DNS) query, and a user datagram protocol (UDP) query.

19. The method of claim 16, wherein the offline analysis comprises an analysis of at least one of, by the at least one computing device: source code of the network service, a configuration file associated with the network service, a manifest file associated with the network service, a service log, a system log, a policy document, and a virtual private cloud (VPC) flow log.

20. The method of claim 16, wherein:
the dependency of the network service is identified from a plurality of potential dependencies determined from an analysis of at least one of source code of the network service, network traffic, a service log, and a system log, based at least in part on a score generated for individual ones of the potential dependencies; and
the anomaly associated with the dependency is identified from a plurality of potential anomalies based at least in part on a score generated for individual ones of the potential anomalies.

* * * * *